US010399703B2

(12) United States Patent
Schill et al.

(10) Patent No.: US 10,399,703 B2
(45) Date of Patent: Sep. 3, 2019

(54) ARTICULATED SUPPORT FOR UNMANNED AIRCRAFT SYSTEM

(71) Applicant: AAI Corporation, Hunt Valley, MD (US)

(72) Inventors: Graham Schill, Upperco, MD (US); Sean Marshall Baity, Westminster, MD (US); Kyle W. McCool, Baltimore, MD (US); Leonard T. Katilas, Baltimore, MD (US)

(73) Assignee: AAI Corporation, Hunt Valley, MD (US)

( * ) Notice: Subject to any disclaimer, the term of this patent is extended or adjusted under 35 U.S.C. 154(b) by 63 days.

(21) Appl. No.: 15/725,382

(22) Filed: Oct. 5, 2017

(65) Prior Publication Data
US 2018/0099764 A1    Apr. 12, 2018

Related U.S. Application Data

(60) Provisional application No. 62/404,436, filed on Oct. 5, 2016.

(51) Int. Cl.
*B64F 1/22* (2006.01)
*B64C 39/02* (2006.01)
*B64F 1/10* (2006.01)

(52) U.S. Cl.
CPC .............. *B64F 1/22* (2013.01); *B64C 39/024* (2013.01); *B64F 1/10* (2013.01);
(Continued)

(58) Field of Classification Search
CPC ...... B64F 1/02; B64F 1/04; B64F 1/06; B64F 1/10; B64F 1/22; B64F 1/222; B64F 5/10;
(Continued)

(56) References Cited

U.S. PATENT DOCUMENTS 2,188,237 A * 1/1940 Weaver ................ F16M 11/16
                                                        248/168
2,712,874 A * 7/1955 Murray ..................... B60P 3/11
                                                        254/10 R
(Continued)

FOREIGN PATENT DOCUMENTS

DE          3543140 A1    6/1987
EP          2103518 A2    9/2009
(Continued)

OTHER PUBLICATIONS

International Search Report and Written Opinion for PCT/US2017/055312, mailed from the International Searching Authority dated Dec. 15, 2017, 13 pages.

*Primary Examiner* — Joseph W Sanderson
(74) *Attorney, Agent, or Firm* — BainwoodHuang

(57) ABSTRACT

An articulated support includes a base and pitch-roll-yaw assembly having a pitch/roll subassembly and a yaw subassembly. The pitch/roll subassembly includes a central member configured for spring-loaded rotation about a pitch/roll axis, and the yaw subassembly has a U-shaped member configured (a) at end portions to engage under-wing connection lugs of an unmanned aircraft system (UAS) and (b) at a central portion to mate to the central member of the pitch/roll subassembly in a rotatable manner providing for rotation of the yaw subassembly about a yaw axis. The pitch/roll subassembly and yaw subassembly are further co-configured to define first and second fixed yaw positions in which a fuselage of the UAS is, respectively, parallel to and perpendicular to the pitch/roll axis, permitting roll motion and pitch motion of the UAS when mounted on the articulated support.

15 Claims, 13 Drawing Sheets

(52) U.S. Cl.
CPC .. *B64C 2201/027* (2013.01); *B64C 2201/088* (2013.01); *B64C 2201/104* (2013.01); *B64C 2201/108* (2013.01); *B64C 2201/165* (2013.01); *B64C 2201/18* (2013.01); *B64C 2201/208* (2013.01)

(58) Field of Classification Search
CPC .......... B64F 5/40; B64F 5/50; B64C 2201/08; B64C 2201/084; B64C 2201/088; B64C 2201/18; B64C 2201/182; B66F 1/00; B66F 3/00; B66F 5/00; B66F 7/22; B60P 3/11; B60P 7/12; F16M 11/2007; F16M 11/2014; F16M 11/2021; F16M 11/2035; F16M 11/2042; F16M 11/205; F16M 11/2064; F41A 23/12; F41A 23/14
See application file for complete search history.

(56) References Cited

U.S. PATENT DOCUMENTS

| | | | | |
|---|---|---|---|---|
| 3,016,802 | A * | 1/1962 | Grunenberg | F41A 23/12 248/186.2 |
| 3,087,630 | A * | 4/1963 | Karnow | F41A 9/87 254/134 |
| 3,355,035 | A * | 11/1967 | Bennett | F17C 13/084 248/171 |
| 3,592,429 | A * | 7/1971 | Miller | F16M 11/10 248/179.1 |
| 3,671,013 | A * | 6/1972 | Everson, Jr. | B64F 1/222 254/8 R |
| 4,131,294 | A * | 12/1978 | Johnson | A01G 23/006 212/242 |
| 4,523,729 | A * | 6/1985 | Frick | B64F 1/04 244/115 |
| 4,697,772 | A * | 10/1987 | Kosugi | F16M 11/105 248/183.3 |
| 5,383,758 | A * | 1/1995 | Patrick | B66F 9/061 414/10 |
| 5,658,124 | A * | 8/1997 | Presnell, III | B66F 3/10 414/11 |
| 6,272,785 | B1 * | 8/2001 | Mika | F41A 23/14 42/94 |
| 6,702,064 | B2 * | 3/2004 | Huang | B66F 7/22 182/141 |
| 7,243,590 | B2 * | 7/2007 | McClellan | F41H 5/12 89/36.06 |
| 8,020,816 | B2 * | 9/2011 | Laitila | F16M 13/00 16/342 |
| 8,162,256 | B2 * | 4/2012 | Goossen | B64C 39/024 244/110 E |
| 8,894,024 | B2 * | 11/2014 | Deros | F16M 11/041 248/124.1 |
| 9,352,468 | B2 * | 5/2016 | Ehrenleitner | B25J 9/0048 |
| 9,505,493 | B2 * | 11/2016 | Borko | B64C 39/024 |
| 9,957,064 | B2 * | 5/2018 | Miller | B64F 1/06 |
| 2003/0183451 | A1 * | 10/2003 | Huang | B66F 7/22 182/141 |
| 2007/0131103 | A1 * | 6/2007 | McClellan | F41H 5/12 89/37.03 |
| 2009/0236470 | A1 * | 9/2009 | Goossen | B64C 39/024 244/115 |
| 2011/0024587 | A1 * | 2/2011 | Tsai | A47K 10/10 248/206.2 |
| 2012/0273631 | A1 * | 11/2012 | Deros | F16M 11/041 248/122.1 |
| 2014/0001318 | A1 * | 1/2014 | Ehrenleitner | B25J 9/0048 248/122.1 |
| 2015/0266575 | A1 * | 9/2015 | Borko | B64C 39/024 701/3 |
| 2016/0257426 | A1 | 9/2016 | Mozer et al. | |
| 2017/0144776 | A1 * | 5/2017 | Fisher | B64C 39/024 |
| 2018/0305191 | A1 * | 10/2018 | Renquist | B66F 5/04 |

FOREIGN PATENT DOCUMENTS

| | | | |
|---|---|---|---|
| EP | 2899128 A1 | 7/2015 | |
| FR | 3013333 A1 * | 5/2015 | .............. B66C 5/02 |
| WO | 2016130847 A1 | 8/2016 | |

\* cited by examiner

ARTICULATED SUPPORT FOR UNMANNED AIRCRAFT SYSTEM

BACKGROUND

The present invention is related to the field of unmanned aircraft systems (UASs), also referred to as unmanned aerial vehicles (UAVs) or "drones". In particular, the invention relates to hybrid UASs having both (1) fixed wings for fixed-wing operational flight, and (2) rotary wings for vertical take-off and landing (VTOL) flight.

SUMMARY

Disclosed is a system that provides for deployment, command and control, and sustained operations of a fixed-wing small UAS (e.g., 95 pounds gross takeoff weight), which in one embodiment may utilize a single compact vehicle that includes equipment and resources necessary for successful operations. A multi-function articulated support enables stowage, transport, and operational support necessary to implement a vertical take-off and landing (VTOL) capable fixed wing aircraft. This includes features enabling maintenance, pre-flight procedures, and launch of a small UAS aircraft by a single operator, which enables the system to be deployed with a crew of two (e.g., maintainer and pilot) with a rapid deployment capability embodied in a single commercial vehicle platform.

More particularly, a disclosed articulated support includes a base and a pitch-roll-yaw assembly attached to the base, the pitch-roll-yaw assembly including a pitch/roll subassembly and a yaw subassembly. The pitch/roll subassembly includes a central member configured for spring-loaded rotation about a pitch/roll axis, and the yaw subassembly has a generally U-shaped member configured (a) at end portions to engage under-wing connection lugs of the unmanned aircraft system and (b) at a central portion to mate to the central member of the pitch/roll subassembly in a rotatable manner providing for rotation of the yaw subassembly about a yaw axis perpendicular to the pitch/roll axis. The pitch/roll subassembly and yaw subassembly are further co-configured to define first and second fixed yaw positions in which a fuselage of the unmanned aircraft system is, respectively, parallel to and perpendicular to the pitch/roll axis, permitting roll motion and pitch motion of the unmanned aircraft system when mounted on the articulated support.

Thus the multi-function support provides for transport, ground handling, and launch of the unmanned aircraft system. The articulated mechanism enables pitch/roll/yaw positioning of the aircraft by a single person and pre-positioning for vertical launch without removing the aircraft from the support.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

System Overview

Figure 1:
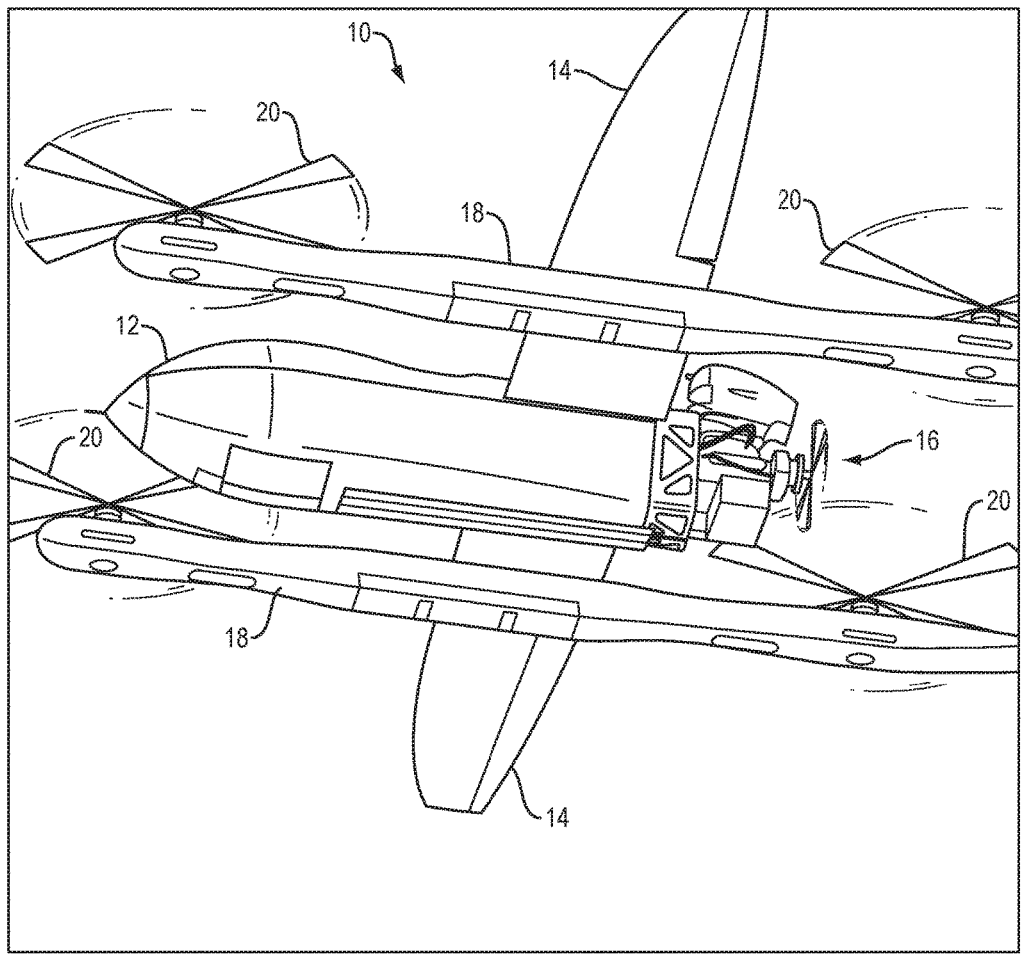
FIG. 1 is a depiction of an unmanned aircraft system (UAS) in flight.

The disclosed support provides for the deployment, command and control, and sustained operations of a fixed-wing small UAS (e.g., 95 pounds gross takeoff weight), which in one embodiment may utilize a single compact vehicle that includes equipment and resources necessary for successful operations. A multi-function articulated support enables the stowage, transport, and operational support necessary to implement a vertical take-off and landing (VTOL) capable fixed wing aircraft. This includes design features enabling maintenance, pre-flight procedures, and launch of a small UAS aircraft by a single operator. This enables the system to be deployed with a crew of two (maintainer and pilot) with a rapid deployment capability embodied in a single commercial vehicle platform.

The overall system utilizes a vehicle such as a heavy duty 4×4 crew-cab pickup truck. The truck includes provisions for full UAS transport, operation and sustainment of runway-independent operations executed by a crew of two individuals. The truck includes integrated ground control technologies to enable beyond visual line of sight operation of the UAS as well as all necessary sustainment equipment. A mission ready aircraft is stored in the rear of the truck and easily removed using a sliding drawer. The design of the aircraft accommodates this integration with removable outer wing sections that enables a fully functioning aircraft to be fit within the space limitations of the rear of the truck. The aircraft is stored on a multi-function support that provides a secure attachment for transport, ground handling, and launch. The multi-function support includes an articulated mechanism to enable pitch/roll/yaw of the aircraft by a single person and pre-position for launch without removing the aircraft from the support.

Outline of Improvements

This section presents a summary of improvements provided by the disclosed system, in outline form.

1. Integrated Mobile VTOL UAS System With Transport, Launch and Operation Support
    a. Transport vehicle (e.g., truck) with:
        i. Personnel compartment for 2-person crew (pilot and maintainer)—e.g., cab section of truck, including driver's seat ii. VTOL UAS transport compartment (e.g., covered bed section of truck, optionally including slide-mount
 iii. VTOL UAS in stowed configuration in transport compartment, optionally also including ground launch support, optionally pre-mounted in flight-ready manner.
 b. Operating equipment:
  i. Single Operator Ground Control Station
  ii. Extended Range Ground Data Terminal with tracking dish antenna and extendable mast.
 c. Optional/augmented features:
  i. External Communications and Back-Haul Connectivity
  ii. Ground Support Equipment/Tools
  iii. Power Conditioning and Back-Up
2. Transport and Launch Process for VTOL UAS
 a. Stowage/Transport of a mission-ready aircraft within transport vehicle
  i. Sliding ingress/egress
  ii. Aircraft can be in a "delayed launch" preflight condition, attached to ground launch support, aircraft outer wing panels removed
 b. Aircraft Pre-Flight
  i. Roll/Pitch/Yaw Calibration
 c. Launch
  i. Rotate to align to prevailing wind
  ii. Locked position
  iii. Release for VTOL lift off
3. Aircraft with Modular Tail Assembly Supporting Add-On VTOL Configuration
 a. Single boom type for both L/R use; L/R tail blocks adapt boom to tail
4. Ground Launch Support for VTOL UAS
 a. Stowable with UAS in transport compartment of transport vehicle
 b. Mountable on separate cart for cart-based deployments
 c. Pre-Flight Support:
  i. Articulated in Roll/Pitch/Yaw
  ii. Spring loaded to enable single individual operation, enabling a 2 person crew (one handling UAS, the other at separate control station executing pre-flight or maintenance operations)
 d. Launch Support:
  i. Rotate to align to prevailing wind
  ii. Locked position
  iii. Support with sufficient clearance of the running propellers
  iv. Release for VTOL lift off
  v. Provisions for added stability for aircraft when in windy conditions (weight, stakes)
 e. Aircraft ground handling:
  i. Quick clasps attach to cart Of particular emphasis is modularity and a use case of easily moving between transport and launch (i.e. removing the support with attached UAS from a truck bed), as well as reducing required manpower (i.e. spring loaded support operable by one operator or attendant).

FIG. 1 shows an unmanned aircraft system (UAS) 10, also referred to as an unmanned aerial vehicle (UAV). The basic structure is that of a fixed-wing aircraft having an elongated fuselage 12 and fixed wings 14, with propulsion provided by a rear-mounted engine and propeller 16. The UAS 10 is also configured for vertical takeoff and landing (VTOL) through the use of booms 18, each attached to the underside of a respective wing 14 and carrying respective upward-facing propellers 20. The propellers are powered by respective small engines within the booms 18, not visible in this view. With the addition of VTOL structure and capability as described, the UAS 10 may be referred to as a "hybrid" UAS 10.

In operation, the UAS 10 is launched vertically, typically from a ground position, then flown in a conventional fixed-wing manner, and may be landed vertically as well. During launch and landing the propellers 20 are used to provide vertical thrust, while the rear-mounted engine and propeller 16 are either active or at idle. During fixed-wing flight, the rear-mounted engine and propeller 16 provide horizontal thrust, and the VTOL propellers 20 are idle. Although the booms 18 represent undesirable weight and drag for fixed-wing flight, there are applications in which this drawback is outweighed by the desired VTOL capability. In one embodiment, the booms 18 are of identical construction notwithstanding that they are used on opposite sides of the UAS 10. Left/right dependencies may be accommodated by use of adaptors as necessary, for example to connect to the V-shaped tail.

Figure 2:
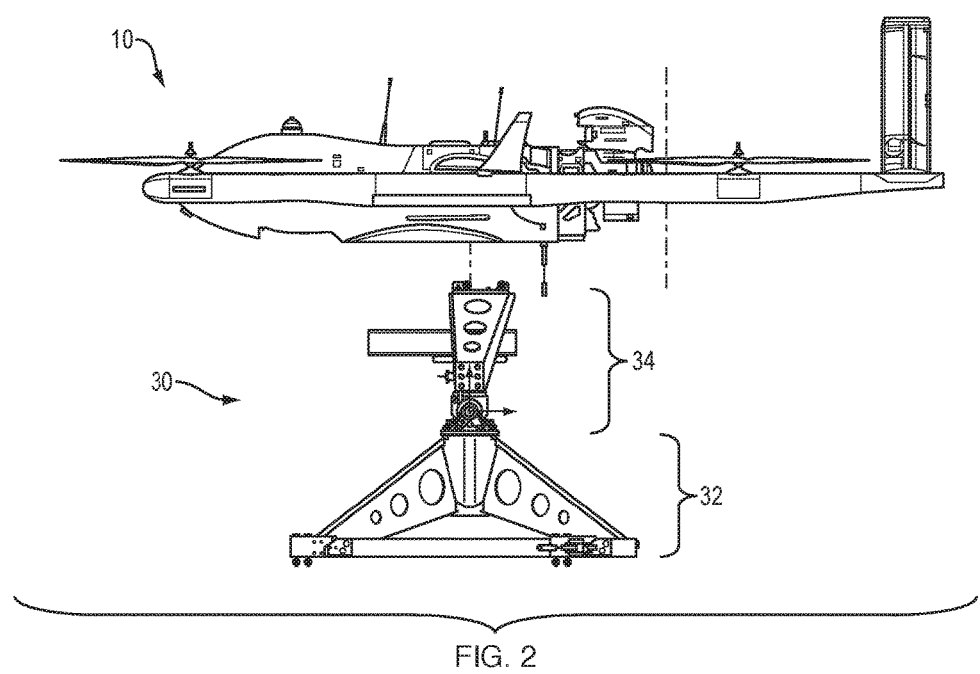
FIG. 2 is a depiction of a UAS and associated articulated support.

FIG. 2 shows the UAS 10 and an articulated support 30 which can be used to hold the UAS 10 during storage, transport, maintenance and take-off as described herein. The support 30 has a lower base 32 and an upper pitch-roll-yaw assembly 34 that is articulated with the base 32. In use, the UAS 10 may be securely attached to the support 30 via attachment lugs at an underside of the wings, or it may simply rest upon the support 30 without attachment, while the base 32 rests upon the ground, man-made platform (which may be either dynamic or static), or other structure (either dynamic or static). The support 30 is preferably of an overall height that allows a desired amount of rotation of the UAS 10 about a pitch/roll axis, as described more below. In one embodiment, the UAS 10 has a length and wingspan in the range of 10-15 feet, and the support 30 has a height in the range of 3-5 feet.

Figure 3:
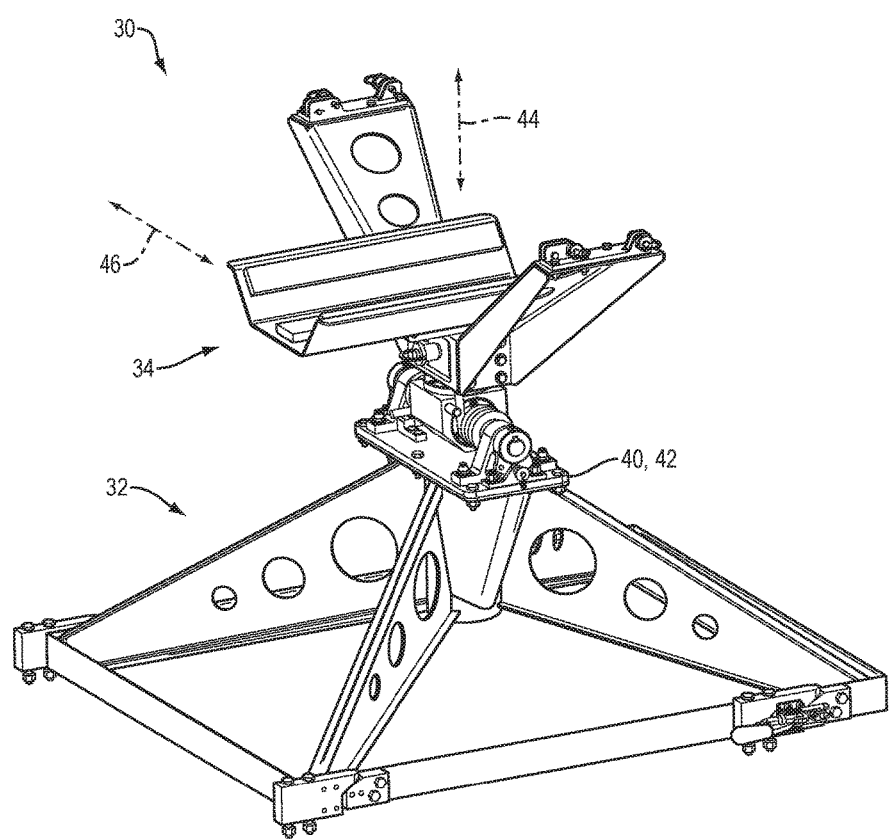
FIG. 3 is a perspective view of the articulated support.

FIG. 3 shows the support 30 including base 32 and pitch-roll-yaw assembly 34. The pitch-roll-yaw assembly 34 has a lower flange plate 40 that is bolted to a corresponding upper flange plate 42 of the base 32. FIG. 3 also shows two reference axes, a vertically extending yaw axis 44 and a horizontally extending pitch/roll axis 46, which serve as references for structure and function as described more below.

Figure 4:
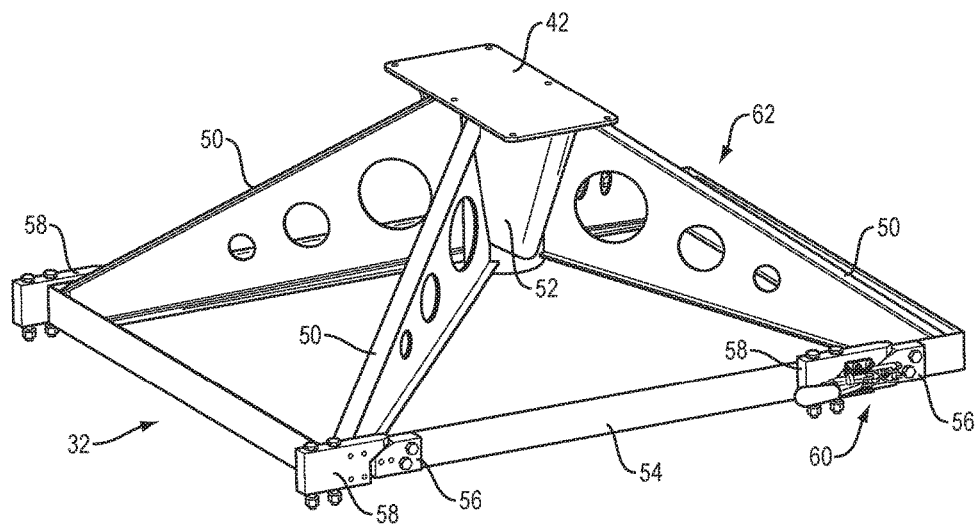
FIG. 4 is a perspective view of a base of the articulated support.

FIG. 4 shows the base 32, which provides a stability footprint to the pivot mechanism provided by the pitch-roll-yaw assembly 34. In the illustrated embodiment, the base 32 has a generally pyramidal shape with four tapered I-beam legs 50 extending away from a central hub 52 on which the flange plate 42 is located. The legs 50 extend to a four-sided retention frame 54 with features for securing the base 32 to an underlying platform or other structure. In particular, the frame 54 has four wedge blocks 56 secured thereto, which mate with corresponding anchor blocks 58 that are secured to the underlying platform. At one end of the frame 54 (rightward in FIG. 4) the blocks 56, 58 include a wedge-type draw latch mechanism 60 that establishes tight retention of the base 32, as described in more detail below. One mechanism 60 is visible in FIG. 4; the other is at the right rear corner 62 of the frame 54 which is obscured in FIG. 4.

Figure 5:
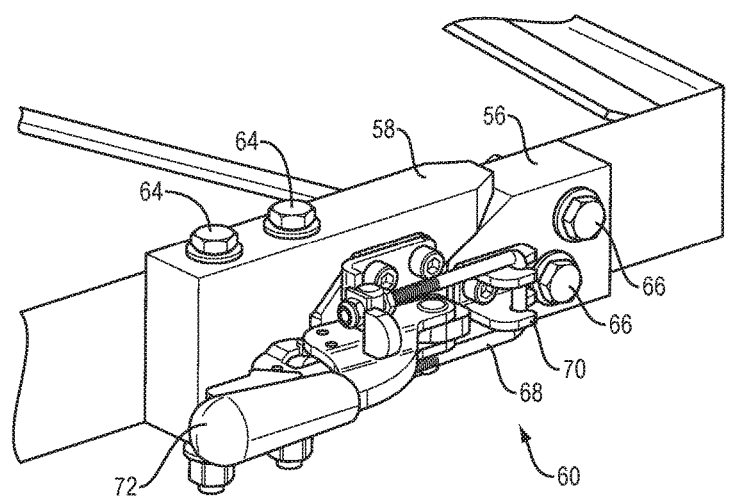
FIG. 5 is a detailed view of a wedge-type draw latch mechanism used to secure the articulated support to a platform.

FIG. 5 shows the wedge-type draw latch mechanism 60. The blocks 56, 58 have mating faces that meet at a sloped angle, for example 30 degrees from horizontal. The anchor block 58 has bolts 64 extending therethrough for securing the anchor block 60 to the underlying platform or other structure. The wedge block 56 is attached to the retention frame 54 by bolts 66. A lever 68 on the anchor block 58 is captured by a catch 70 on the wedge block 56 when a handle 72 is in the illustrated locked position, establishing tension for retaining the base 32 in position. When the handle 72 is rotated to an open or unlocked position (rightward in FIG. 5, not shown), the lever 68 is released from the catch 70 and the tension is removed, enabling the base 32 to be slid away slightly (rightward in FIGS. 4-5) and removed from the platform or other structure to which it is mounted.

In alternative embodiments, the interfaces of the base (realized by the blocks 56, 58 in the illustrated embodiment) may be realized in different ways, such as using sheet metal features and/or various forms of positive locking fasteners such as clips, clamps, cam locks, etc.

Figure 6:
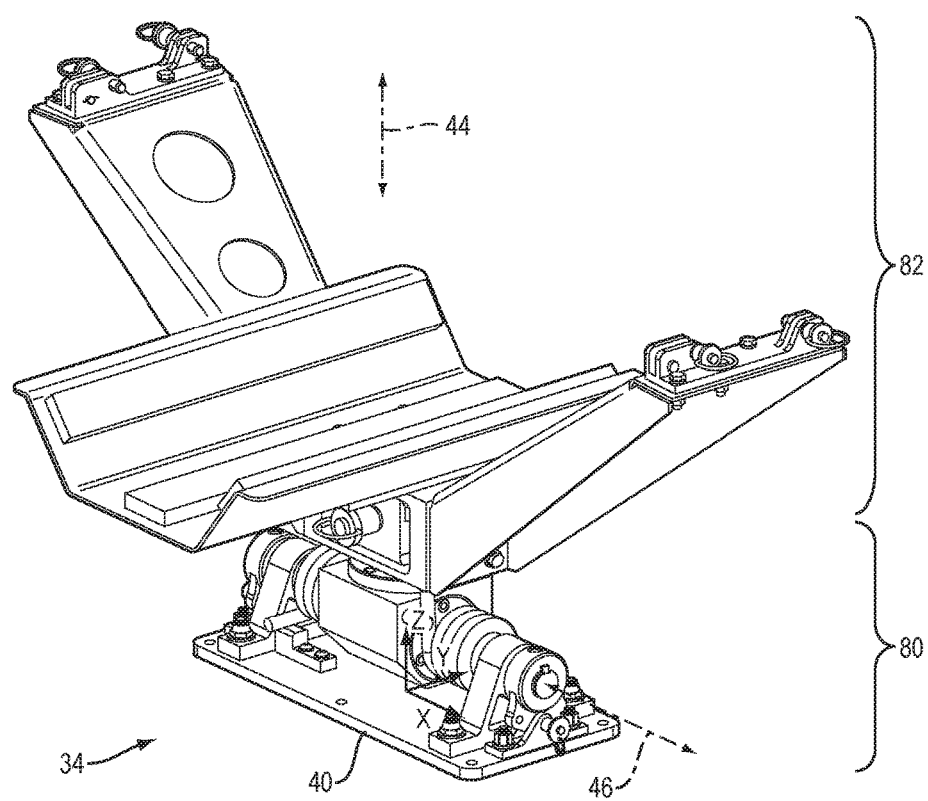
FIG. 6 is a perspective view of a pitch-roll-yaw assembly.
Figure 7:
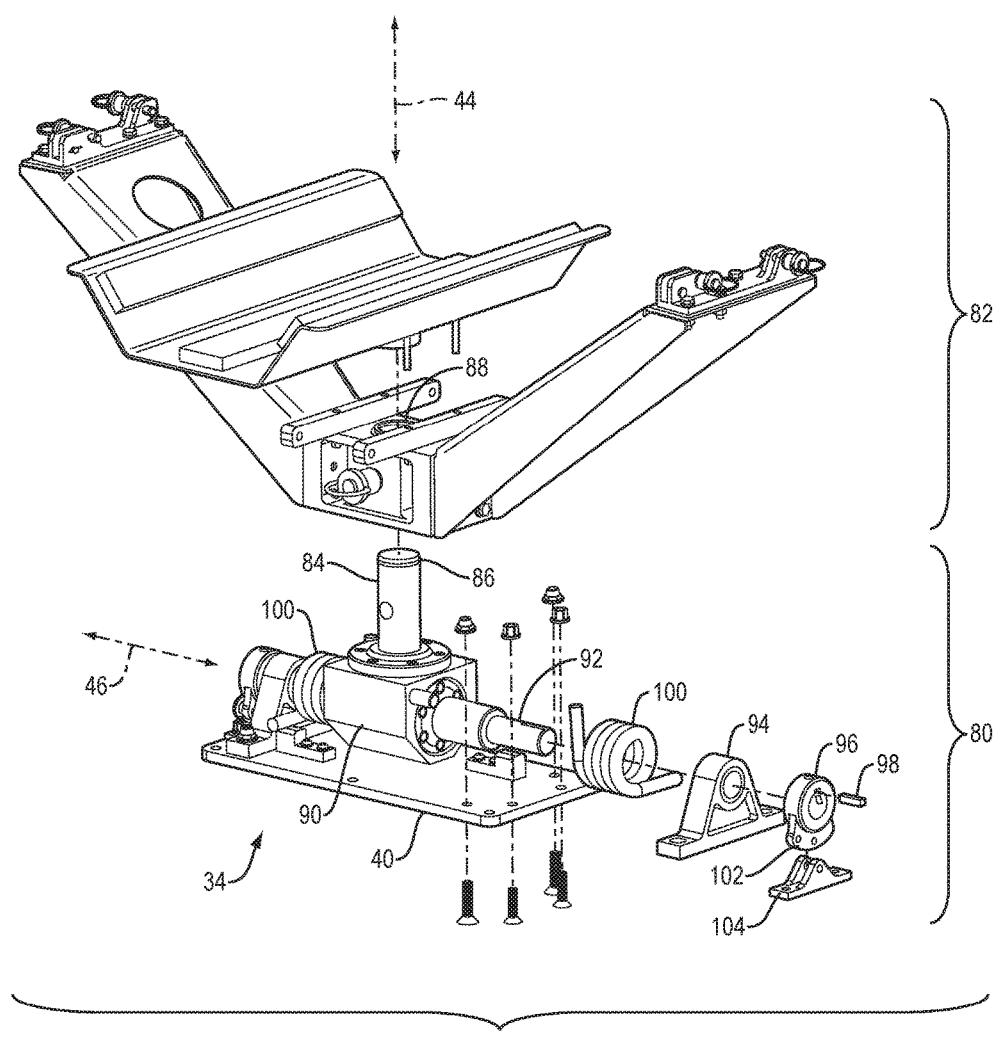
FIG. 7 is a perspective exploded view of the pitch-roll-yaw assembly.

FIGS. 6-7 show the pitch-roll-yaw assembly 34, assembled and exploded respectively. It includes a pitch/roll subassembly 80 and a yaw subassembly 82. As best seen in FIG. 7, the yaw subassembly 82 rests on top of the pitch/roll subassembly 80, with an opening receiving a post 84 extending upwardly along the yaw axis 44. This configuration provides for rotation of the yaw subassembly 82 about the yaw axis 44 relative to the pitch/roll subassembly 80. The post 84 has a groove 86 for receiving an O-ring retainer 88 to secure the two subassemblies 80, 82 together. Additional details regarding the yaw subassembly 82 are provided below.

The pitch/roll subassembly 80 has a central member 90 from which the post 84 extends and mounted for limited rotation about the pitch/roll axis 46. In particular, and as best seen in FIG. 7, mounting shafts 92 extend from the central member 90 through corresponding mounting blocks 94 that are secured to the flange plate 40. The ends of the shafts 92 are covered by respective caps 96 and retained by respective splines 98. Coil springs 100 provide spring loading for rotation in respective directions (CW, CCW) about the pitch/roll axis 46. The caps 96 have flanges 102 with openings that align with respective openings of a lock member 104 used to lock the rotational position of the central member 90, and thus of an attached UAS 10 as described more below.

Figure 8:
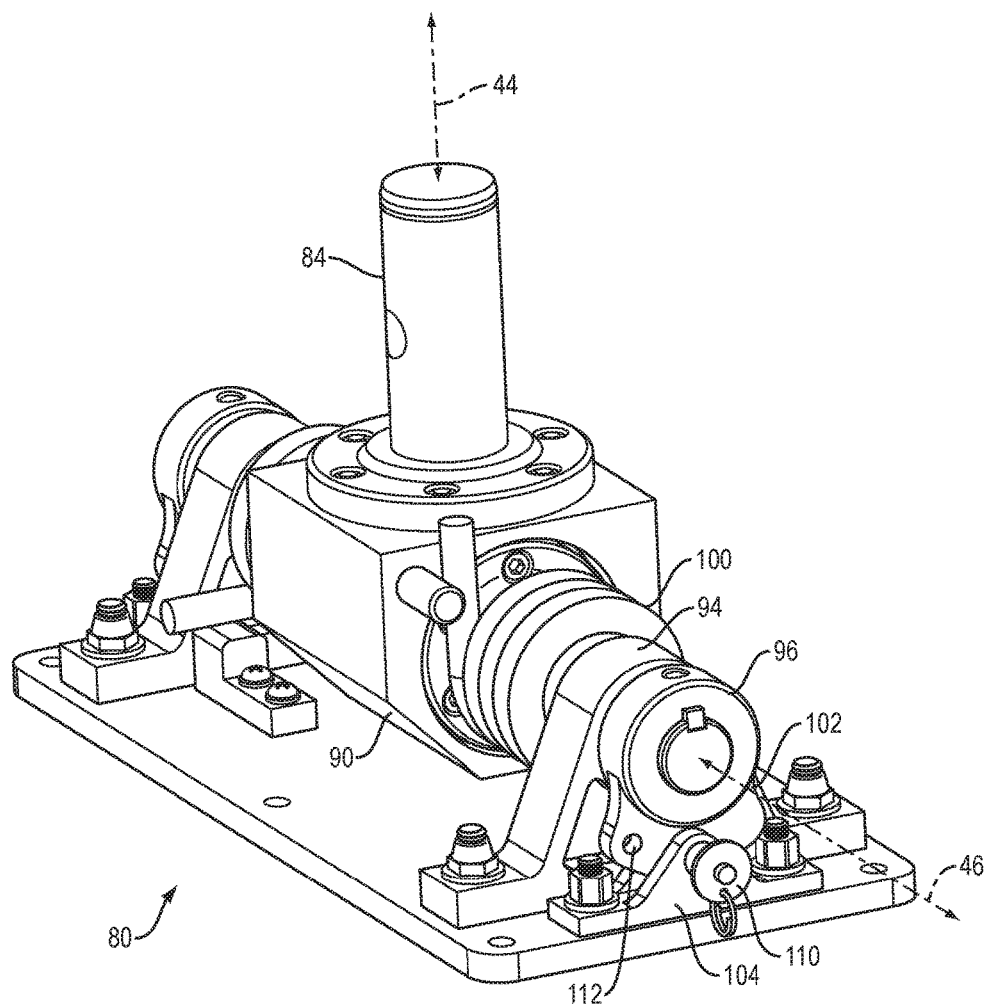
FIG. 8 is a detailed perspective view of a pitch/roll subassembly.

FIG. 8 shows just the pitch/roll subassembly 80 at slightly larger scale. The above-described locking mechanism can be appreciated, with the flange of the cap 96 extending into the lock member 104 and a locking pin 110 extending through the aligned holes, locking the mechanism with the post 84 in a vertical position. In this position the springs 100 are at medium and equal compression, i.e., it is a position of mechanical equilibrium. Each cap 96 also has a respective additional hole 112 used to lock the mechanism in a rotated position, i.e., by aligning the hole 112 with the hole of the lock member 104 and inserting the pin 110. This provides for pitched and rolled positions of the UAS 10 as described more below. In these positions one spring 100 is at maximum compression while the other is at minimum, so that a restoring rotation force is provided that counteracts the moment of a rotated UAS 10.

Figure 9:
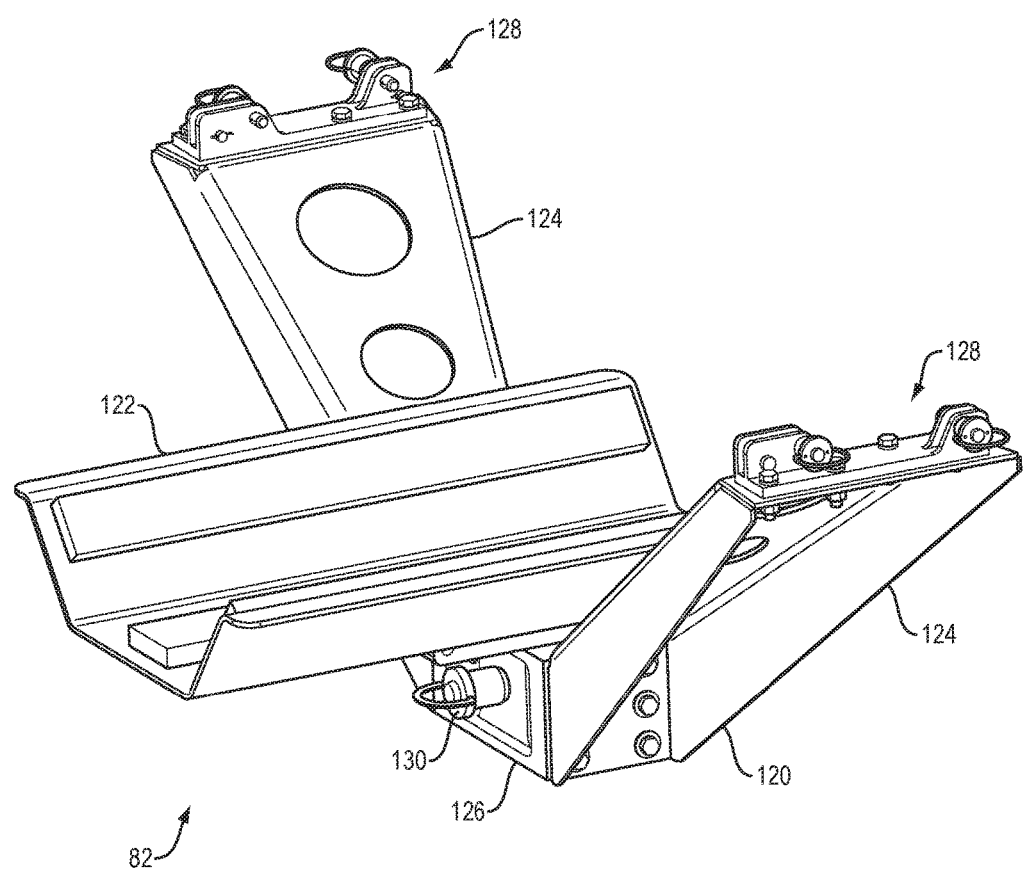
FIG. 9 is a detailed perspective view of a yaw subassembly.

FIG. 9 shows the yaw subassembly 82. It includes a generally U-shaped member 120 and a horizontally extending pan 122. The U-shaped member 120 has arms 124 extending upward from a box-like central portion 126, to which the pan 122 is also attached. The arms 124 are configured at their respective end portions 128 to engage under-wing lugs of the UAS 10, as described more below. In one embodiment the end portions 128 engage the same under-wing lugs that can also be used for conventional catapult launching, i.e., the arrangement is backward compatible with conventional catapult-launched UASs. Such backward compatibility enables the support 30 to be used for transport or maintenance of such conventional UASs if desired. The pan 122 can support the UAS 10 when not secured to the arms 124, for example during takeoff and as a temporary resting position during the process of mounting/dismounting a UAS 10 to/from the support 30.

Also shown in FIG. 9 is a yaw locking pin 130 which is inserted into aligned holes of the U-shaped member 120 and the post 84 of the pitch/roll subassembly 80 (not shown in FIG. 9; see FIG. 8). This locks a mounted UAS 10 into one of two fixed yaw positions—one in which the fuselage 12 is parallel with the pitch/roll axis 46, and another in which the fuselage 12 is perpendicular to the pitch/roll axis 46. It will be appreciated that the first (parallel) position provides for roll motion of a mounted UAS 10, while the second (perpendicular) position provides for pitch motion of a mounted UAS 10. These are described in additional detail below.

Figure 10:
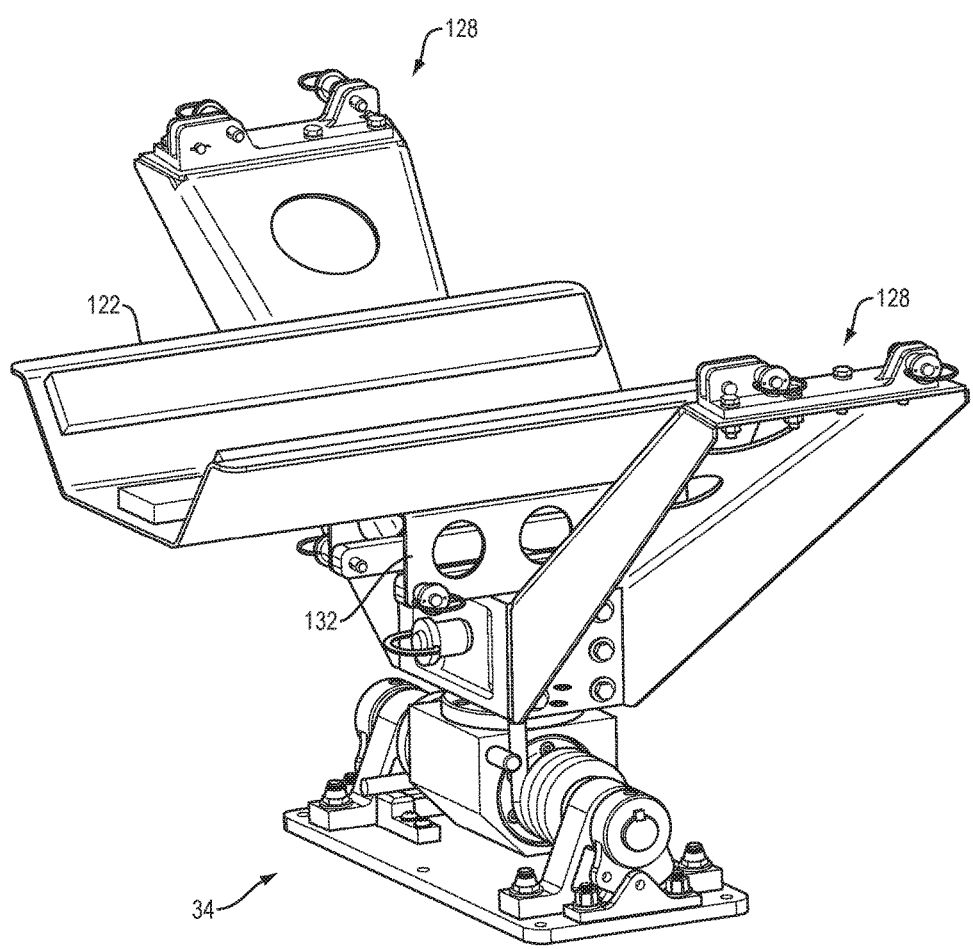
FIG. 10 is a perspective view of a pitch-roll-yaw assembly according to another embodiment.

FIG. 10 shows an alternative in which the pan 122 is located higher by use of a standoff member 132. This pan location can be used in support of VTOL takeoff, enabling the UAS 10 to be supported by the pan 122 without the wings interfering with the end portions 128.

Figure 11:
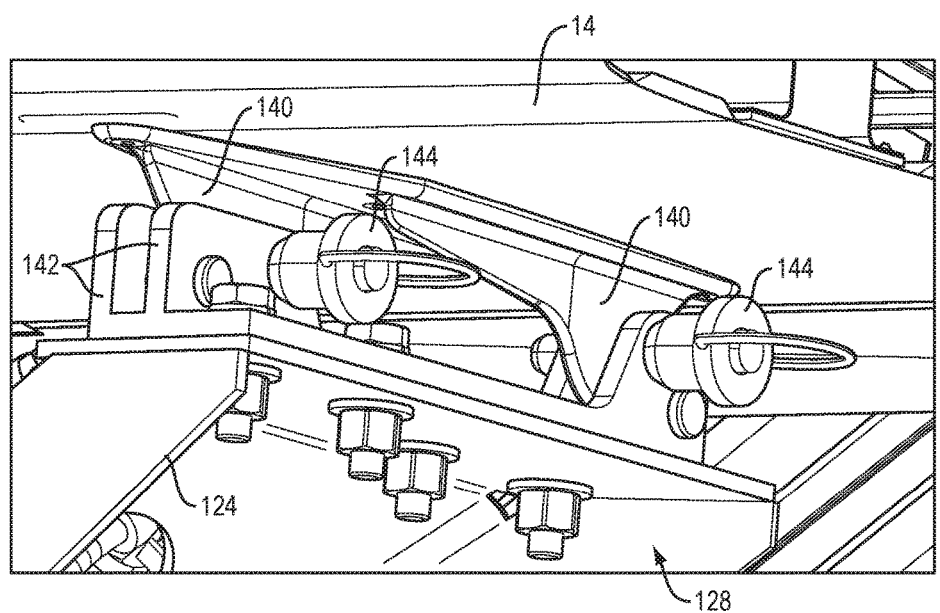
FIG. 11 is a detailed view of connection between arms of the articulated support and under-wing connection lugs of a UAS.

FIG. 11 shows the above-mentioned under-wing connection arrangement for one wing 14 of a UAS 10 and corresponding arm 124 of the support 30. A similar arrangement, mirrored about the axis of the UAS 10, exists for the other wing 14 and arm 124. Connection lugs 140 at the underside of the wing 14 are received by corresponding slots defined by upward-extending flanges 142 of the end portion 128, with horizontal holes in each member (not visible in FIG. 11) being aligned and receiving corresponding locking pins 144. In one embodiment the locking pins 144 are ball-detent pins having small spring-loaded balls near their ends that help prevent the pins from becoming dislodged, while yielding to sufficient force to allow for removal by a human, with or without an assistive tool.

Figure 12:
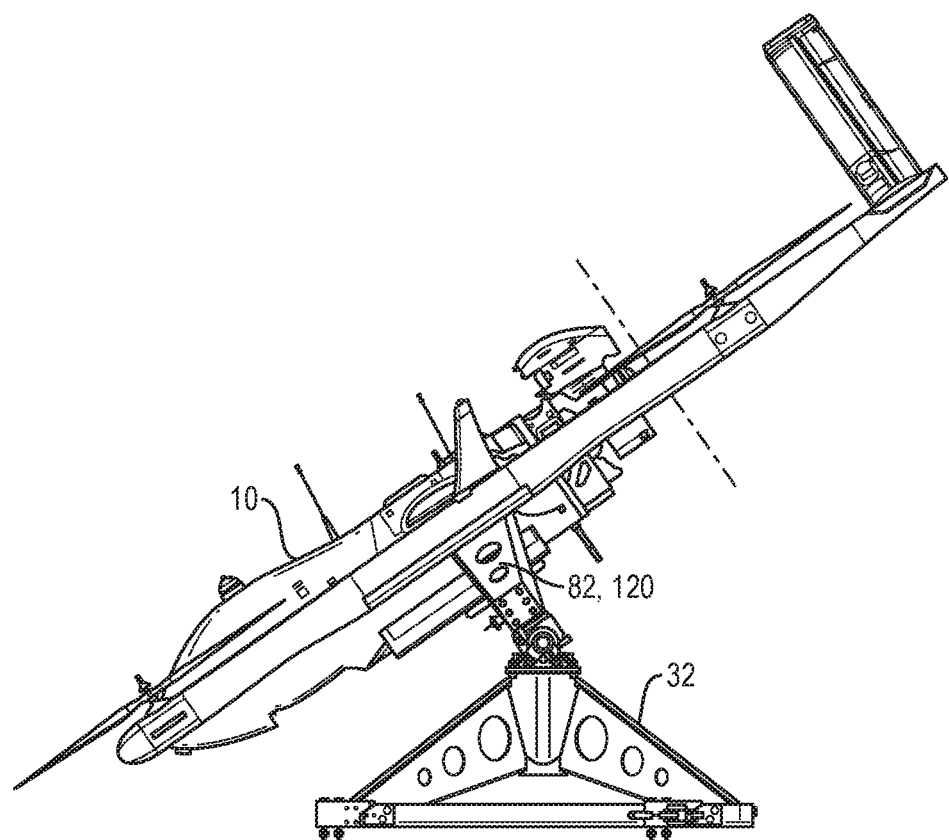
FIGS. 12-14 are elevation view of the articulated support with attached UAS in various positions as enabled by the pitch-roll-yaw assembly.
Figure 13:
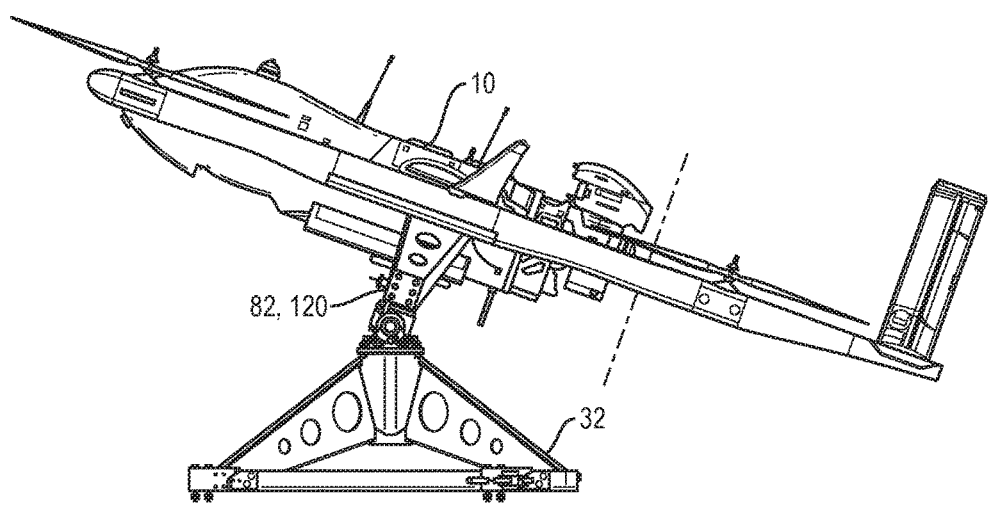
Figure 14:
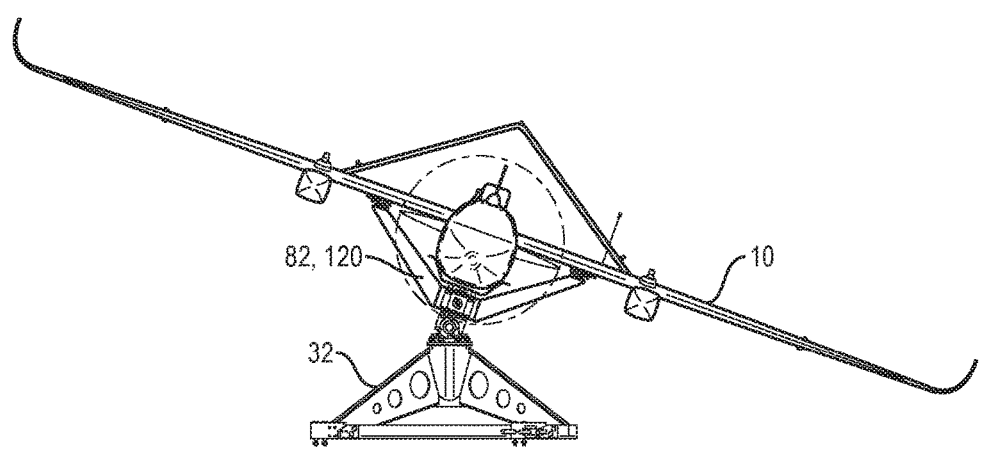

FIGS. 12-14 illustrate the use of the support 30 with a UAS 10 mounted thereon. In each of these Figures the lower base 32 has the same position, with the pitch/roll axis 46 of the pitch/roll subassembly 80 (see FIG. 5) oriented into the page. FIGS. 12-13 illustrate pitch positions, downward and upward respectively, with the yaw subassembly 82 in a first rotational position in which the U-shaped member 120 is parallel with the pitch/roll axis 46. In each of these pitch positions, the spring forces of the springs 100 are sufficient to retain the UAS 10 in the illustrated position, counteracting its unbalanced moment. FIG. 14 illustrates a leftward roll position, with the yaw subassembly 82 in a second rotational position in which the U-shaped member 120 is perpendicular to the pitch/roll axis 46. A similar counteraction of the spring forces occurs in this position as well.

Figure 15:
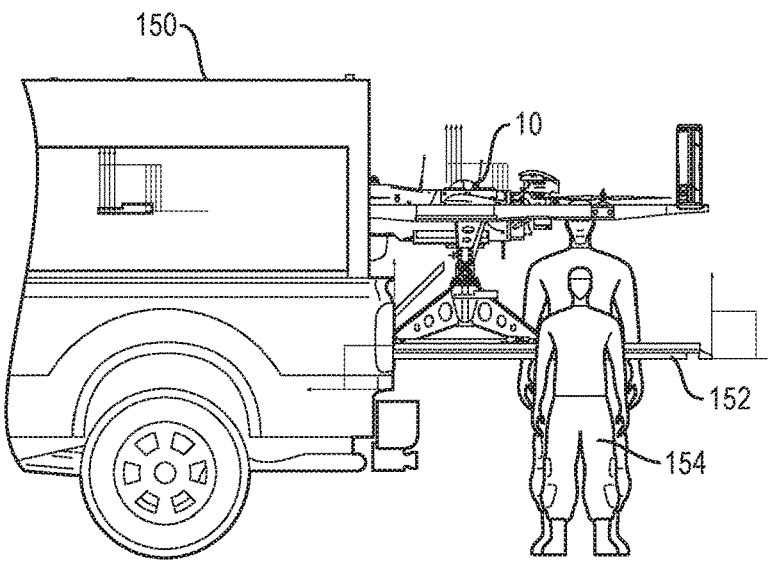
FIG. 15 is a depiction of use of the articulated support for transporting a UAS in the bed of a truck.

FIG. 15 illustrates use of the support 30 for transporting a UAS 10 in a truck 150 or similar cargo-carrying vehicle. The support 30 is mounted to a sliding platform 152 mounted to the rear bed of the truck 150. In use, a two-person team 154 can slide the platform 152 rearward and then remove the support 30 with attached UAS 10 from the platform 152 and place it on the ground or other desired location.

Figure 16:
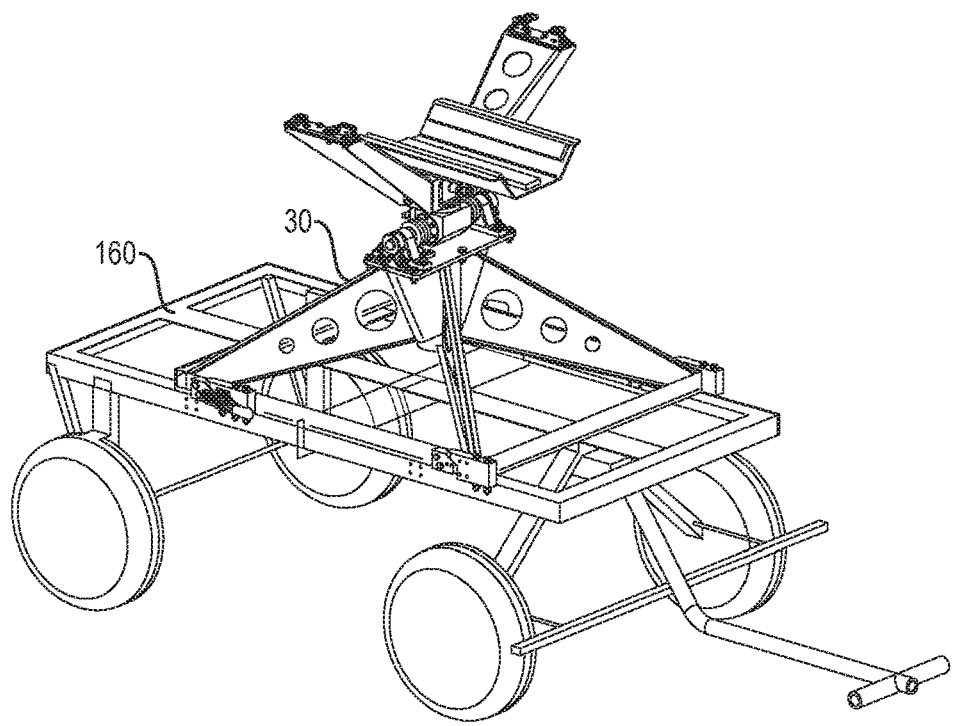
FIG. 16 is a depiction of use of the articulated support for transporting a UAS on a cart.

FIG. 16 illustrates use of the support 30 for transporting a UAS 10 on a cart 160, which may be useful for short-distance transport. For this type of use the support 30 may include additional features for temporary secure mounting to the cart 160.

Although the above disclosure presents a manned use of the support 30, in an alternative the disclosed mechanism could be automated and remotely actuated. Specifically, the elements providing rotation about the pitch/roll axis and yaw axis could be motor controlled/actuated, and the pins could be replaced with actuated latches so that electrical commands could replace a human attendant. The benefits of the two axis mechanism, spring loaded torque balance support, and modular interfaces would remain, with the additional benefit of not requiring a human attendant. Such an alternative support may be used in application in which systems are remotely deployed and operated without human interaction, and/or applied to a mobile platform (i.e. ship deck or vehicle).

While various embodiments of the invention have been particularly shown and described, it will be understood by those skilled in the art that various changes in form and details may be made therein without departing from the scope of the invention as defined by the appended claims.

What is claimed is:

1. An articulated support for an unmanned aircraft system, comprising:
    a base; and
    a pitch-roll-yaw assembly attached to the base, the pitch-roll-yaw assembly including a pitch/roll subassembly and a yaw subassembly, the pitch/roll subassembly including a central member configured for spring-loaded rotation about a pitch/roll axis, the yaw subassembly having a U-shaped member configured (a) at end portions to engage under-wing connection lugs of the unmanned aircraft system and (b) at a central portion to mate to the central member of the pitch/roll subassembly in a rotatable manner providing for rotation of the yaw subassembly about a yaw axis perpendicular to the pitch/roll axis, the pitch/roll subassembly and yaw subassembly being further co-configured to define first and second fixed yaw positions in which a fuselage of the unmanned aircraft system is, respectively, parallel to and perpendicular to the pitch/roll axis, permitting roll motion and pitch motion of the unmanned aircraft system when mounted on the articulated support,
    wherein the pitch/roll subassembly includes:
        a pair of mounting shafts extending from the central member along the pitch/roll axis through corresponding mounting blocks; and
        a pair of coil springs each mounted on a respective one of the mounting shafts and configured to provide the spring-loaded rotation of the central member about the pitch/roll axis.

2. The articulated support of claim 1, wherein the mounting blocks are secured to a flange plate of the pitch/roll subassembly, the flange plate being secured to a corresponding flange plate of the base.

3. The articulated support of claim 1, wherein the ends of the mounting shafts are covered by respective caps having respective flanges with openings that align with respective openings of a lock member used to lock the rotational position of the central member.

4. The articulated support of claim 3, wherein the flange of each cap has two holes corresponding to upright and rotated pitch/roll positions respectively of the central member, one hole being aligned with a hole of the lock member in the upright position and the other hole being aligned with the hole of the lock member in the rotated position, a locking pin being placed through the aligned holes to lock the central member in either position.

5. The articulated support of claim 1, wherein the pitch/roll subassembly includes a post extending upwardly along the yaw axis from the central member, the post being received in an opening of the yaw subassembly.

6. The articulated support of claim 5, wherein the post has a groove for receiving an O-ring retainer to secure the yaw subassembly to the pitch/roll subassembly.

7. The articulated support of claim 1, wherein the yaw subassembly further includes a horizontally extending pan configured to receive the fuselage of the unmanned aircraft system, enabling the articulated support to temporarily support and elevate the unmanned aircraft system without the unmanned aircraft system being mounted to the end portions of the U-shaped member.

8. The articulated support of claim 7, wherein the pan is attached to and supported by the central member of the yaw subassembly.

9. The articulated support of claim 8, wherein the pan is positioned to support the unmanned aircraft system with its wings clearing the end portions of the U-shaped member, providing for vertical take-off of the unmanned aircraft system from the articulated support.

10. The articulated support of claim 1, wherein each end portion includes retention flanges defining retention slots for receiving the under-wing connection lugs of the unmanned aircraft system, the retention flanges having holes that align with corresponding holes of the connection lugs to receive a removable retention pin used to secure the unmanned aircraft system to the articulated support.

11. The articulated support of claim 1, wherein the base has a pyramidal shape narrowing to a top to which the pitch-roll-yaw assembly is mounted.

12. The articulated support of claim 11, wherein the top includes a horizontal flange plate to which a corresponding horizontal flange plate of the pitch-roll-yaw assembly is attached to mount the pitch-roll-yaw subassembly to the base.

13. The articulated support of claim 11, wherein the base includes a set of I-beam legs extending downwardly and outwardly to a frame surrounding the legs at a bottom of the base.

14. The articulated support of claim 13, wherein the frame includes blocks configured to attach the articulated support to an underlying platform or other structure.

15. The articulated support of claim 14, wherein the blocks include wedge blocks that interface to corresponding anchor blocks, and one or more paired wedge block and anchor block include a wedge-type draw latch mechanism configured to tightly draw the wedge block and anchor block together and retain them in locked relationship.

* * * * *